United States Patent [19]

Watanabe et al.

[11] 4,397,682
[45] Aug. 9, 1983

[54] PROCESS FOR PREPARING METALS FROM THEIR FLUORINE-CONTAINING COMPOUNDS

[75] Inventors: Morio Watanabe, Amagasaki; Sanji Nishimura, Kyoto; Nobuatsu Watanabe, Nagaokakyo, all of Japan

[73] Assignee: Solex Research Corporation, Tokyo, Japan

[21] Appl. No.: 319,956

[22] Filed: Nov. 10, 1981

[30] Foreign Application Priority Data

Nov. 18, 1980 [JP] Japan .................................. 55-161356

[51] Int. Cl.³ ................................................ B22F 9/26
[52] U.S. Cl. .............................. 75/0.5 A; 75/0.5 AA; 75/0.5 AB; 75/0.5 BA; 75/0.5 BB
[58] Field of Search ............. 75/0.5 B, 0.5 BB, 0.5 A, 75/0.5 AB, 0.5 AA, 0.5 BA

[56] References Cited

U.S. PATENT DOCUMENTS

| | | | |
|---|---|---|---|
| 3,234,007 | 2/1966 | Blocher, Jr. et al. | 75/0.5 BB |
| 3,341,320 | 9/1967 | Smiley | 75/0.5 BB |
| 3,480,426 | 11/1969 | Neuenschwander | 75/0.5 BB |
| 3,539,335 | 11/1970 | Svanström | 75/0.5 BB |
| 3,630,718 | 12/1971 | Neuenschwander | 75/0.5 BB |

Primary Examiner—W. Stallard
Attorney, Agent, or Firm—Toren, McGeady and Stanger

[57] ABSTRACT

A process for preparing high purity superfine powders of less than $0.5\mu$ diameter of Mo, W, Nb, Zr, Cu, Zn, Co, Ni and In by first producing their fluoride or a double fluoride with ammonium and then decomposing them under heat in a hydrogen-containing stream. Features of the present process are that the double fluoride of the metals with ammonium is faster in crystal growth than their fluoride, recrystallization of these salts can be repeated as desired when a high purity of the metals is required, and particles of a uniform size can be obtained easier.

2 Claims, 7 Drawing Figures

PROCESS FOR PREPARING METALS FROM THEIR FLUORINE-CONTAINING COMPOUNDS

BACKGROUND OF THE INVENTION

1. Field of the Invention

The present invention relates to a process for preparing high purity metals such as Mo, W, Nb, Zr, Cu, Zn, Ni, Co and In.

2. Description of the Prior Art

Conventionally Mo and W have been prepared by reducing their oxide in a hydrogen atmosphere. However, the disadvantage is that a temperature as high as 1000° to 1100° C. is required for the reduction and the purification procedure prior to obtaining their oxides are complicated. Such metals as Ni and Zn are prepared by leaching with an acid, followed by separation and purification by means of the solvent extraction technique, and by then electrolysis. The disadvantage is much consumption of electrical energy. Zn may be prepared by the reductive distillation at a high temperature, but a rather complicated process of distillation is necessary because of difficult separation from other metals. Cu is prepared generally in the form of crude metal by treating sulfide ores directly in a vertical or reflection furnace followed by the electrolytic purification. However, this process cannot be applied to low quality ores nor to oxide minerals of Cu and only limited kinds of ores are employed as raw material.

Further fine powders of these metals could be obtained by crashing their metal in a stream of hydrogen or an inert gas. But not a little mechanical as well as human energy are required to produce a powder of less than 40μ diameter, and a superfine powder of less than 1μ could not be obtained by any mechanical means.

Superfine powders of Cu, Ni and Co could also be produced by directly reducing with a hydrogen gas their ions in an aqueous solution, but the process requires a high temperature and pressure and an apparatus of a complicated structure. Furthermore it is difficult to prevent the metal powder from re-oxidation.

SUMMARY OF THE INVENTION

The present invention intends to overcome the difficulties of previous processes such as high temperature and pessure necessary for the process, troublesome control of operations and the high cost of production, and provides a process for preparing high purity superfine powders of less than 0.5μ diameter of Mo, W, Nb, Zr, Cu, Zn, Co, Ni and In by first producing their fluoride or a double fluoride with ammonium and then decomposing them under heat in a hydrogen-containing stream. Features of the present process are that the double fluoride of the metals with ammonium is faster in crystal growth than their fluoride, recrystallization of these salts can be repeated as desired when a high purity of the metals is required, and particles of a uniform size can be obtained easier.

DETAILED DESCRIPTION OF THE INVENTION

It is possible by utilizing the solvent extraction technique to produce the metals (Mo, W, Nb, Zr, Cu, Zn, Co, Ni and In) from their ions and complex ions in an aqueous solution. Therefore raw materials are not limited to any particular sources, but rather low quality ores, manganese nodules and even industrial wastes could be used for the purpose to produce superfine powders of the metals. Thus, a process is provided for preparing metals of high additional values which could be operated with less cost than previous processes.

The essential of the present invention lies in preparing metals Mo, W, Cu, Zn, Co, Ni and In by heating their double fluoride with ammonium simple fluoride in a hydrogen-containing stream, as expressed by following chemical formulae (1) to (11):

$$(NH_4)_2MoF_8 + 3H_2 \rightleftharpoons Mo + 2NH_4F\uparrow + 6HF\uparrow \quad (1)$$

$$(NH_4)_2MoO_2F_4 + 3H_2 \rightleftharpoons Mo + 2NH_4F\uparrow + 2HF\uparrow + 2H_2O\uparrow \quad (2)$$

$$(NH_4)_2WO_2F_4 + 3H_2 \rightleftharpoons W + 2NH_4F\uparrow + 2HF\uparrow + 2H_2O\uparrow \quad (3)$$

$$WO_2F_2 + 3H_2 \rightleftharpoons W + 2HF\uparrow + 2H_2O\uparrow \quad (4)$$

$$CuF_2 + H_2 \rightleftharpoons Cu + 2HF\uparrow \quad (5)$$

$$(NH_4)CuF_3 + H_2 \rightleftharpoons Cu + NH_4F\uparrow + 2HF\uparrow \quad (6)$$

$$(NH_4)_2ZnF_4 + H_2 \rightleftharpoons Zn + 2NH_4F\uparrow + 2HF\uparrow \quad (7)$$

$$(NH_4)_2CoF_4 + H_2 \rightleftharpoons Co + 2NH_4F\uparrow + 2HF\uparrow \quad (8)$$

$$NiF_2 + H_2 \rightleftharpoons Ni + 2HF\uparrow \quad (9)$$

$$(NH_4)_2NiF_4 + H_2 \rightleftharpoons Ni + 2NH_4F\uparrow + 2HF\uparrow \quad (10)$$

$$(NH_4)_3InF_6 + 1.5H_2 \rightleftharpoons In + 3NH_4F\uparrow + 3HF\uparrow \quad (11)$$

There exist fluorine-containing compounds of these metals (Mo, W, Cu, Zn, Co, Ni and In) other than those shown above. A mixture of compounds, instead of a single compound, may naturally occur in industrial application. What kind of fluorine-containing compound is obtained is decided in accordance with conditions of the aqueous solution. The decomposition products $NH_4F$, $HF$, $F$ and $NH_3$ gases are absorbed in water and recycled as solutions of $NH_4F$, $HF$ and $NH_4HF_2$ so as to employ for the production of these metals.

Metal ammonium fluoride, metal ammonium hydrogen fluoride as well as metal fluoride, where the metals include Mo, W, Cu, Zn, Co, Ni and In, can be prepared, for example, by the following method: An aqueous solution which contains said metals in the form of a simple or a complex ion is brought into contact with one or more organic solvents which are selected from the group consisting of alkyl phosphoric acid, alkyl- or aryl-dithiophosphoric acid, carboxylic acid, hydroxyoximes, neutral phosphoric esters and primary to quaternary alkylamines and diluted with a petroleum hydrocarbon, to extract the metals into the solvent, and then the solution in the organic solvent contacts with an aqueous solution which contains one or more compounds selected from the group consisting of HF, $NH_4HF_2$ and $NH_4F$, to produce the metals fluoride and the double fluoride of the metals with ammonium, as shown by equations (12) to (22).

$$R_6Mo + 6NH_4HF_2 \rightleftharpoons (NH_4)_2MoF_8\downarrow + 6R.H + 4NH_4F \quad (12)$$

$$(R_3NH)_2MoO_4 + 2NH_4HF_2 \rightleftharpoons (NH_4)_2MoO_2F_4\downarrow + 2R_3N + 2H_2O \quad (13)$$

$$(R_3NH)_2WO_4 + 2NH_4NF_2 \rightleftharpoons (NH_4)_2WO_2F_4\downarrow + 2R_3N + 2H_2O \quad (14)$$

$$R_2Cu + 2HF \rightleftharpoons CuF_2\downarrow + 2RH \quad (15)$$

$$R_2Cu+2NH_4HF_2 \rightleftharpoons NH_4CuF_3 \downarrow +2RH+NH_4F \quad (16)$$

$$R_2Zn+2NH_4HF_2 \rightleftharpoons (NH_4)_2ZnF_4 \downarrow +2RH \quad (17)$$

$$R_2Ni+2NH_4HF_2 \rightleftharpoons (NH_4)_2NiF_4 \downarrow +2RH \quad (18)$$

$$R_2Ni+2HF \rightleftharpoons NiF_2 \downarrow +2RH \quad (19)$$

$$R_2Co+2HF \rightleftharpoons CoF_2 \downarrow +2RH \quad (20)$$

$$R_2Co+2NH_4HF_2 \rightleftharpoons (NH_4)_2CoF_4 \downarrow +2RH \quad (21)$$

$$R_3In+3NH_4HF_2 \rightleftharpoons (NH_4)_3InF_6 \downarrow +3RH \quad (22)$$

where R.H and $R_3N$ indicate solvents for extraction and $R_2$.metal means a metal which is extracted with an solvent.

In the above expressions only one example is shown of the fluorine-containing compounds of the metals. Therefore the present invention is not restricted to the compounds. Thus, the products may be a mixture of $(NH_4)_2MoF_8$ and $(NH_4)_2MoO_3F_2$ for Mo, a mixture of $NiF_2$ and $(NH_4)_2NiF_4$ for Ni and a mixture of $NH_4ZnF_3$ and $(NH_4)_2ZnF_4$ for Zn. It should be understood that a variety of crystalline compounds may be included for each metal.

Simple and complex ions of the metals (Mo, W, Cu, Zn, Co, Ni and In) in the organic extracting solvents can be extracted with an aqueous solution which is called 'recovering solution'. Concentration of the fluoride compounds in the recovering solution should be at least 20% when HF is the sole solute and at least 10% when the solute is $NH_4F$ to obtain satisfactory results. Necessary concentrations of $NH_4HF_2$, $NH_4F$ and HF is the recovering solution is decided according to the end of recovery.

Followings are the extracting agents to be used in the present invention for the extraction of simple and complex ions of the metals (Mo, W, Cu, Zn, Co, Ni and In).

The group of alkyl phosphoric acids is selected from the following compounds (A) to (F):

where R stands for an alkyl group having 4 to 14 carbon atoms. D$_2$EHPA (Di-2-ethylhexyl phosphoric acid) appearing in Example belongs to Group (A), where the alkyl group is $C_8H_{17}$.

Next, the group of alkyl dithiophosphoric acids and aryl dithiophosphoric acids includes those compounds which could be expressed by the following formula:

where R stands for an alkyl or an aryl group having 4 to 18 carbon atoms.

D$_2$EHPDTA (Di-2-ethylhexyl-dithiophosphoric acid) that appears in an example has an alkyl group $C_8H_{17}$.

The carboxylic acids for use of the extracting agent of this invention belong to a group expressed by the following formulae:

where R is an alkyl group having 3 to 18 carbon atoms.

Versatic-10 (V-10) appearing in an example is a commercial name of a product from Shell Chemical Co., Ltd. that is a compound belonging to the group (A) and has an alkyl group of 9 to 11 carbon atoms.

Ketone used in the present invention has the following general formula:

wherein R represents an alkyl group or an aryl group, having 3 to 15 carbon atoms.

One illustration of the ketone used in the embodiments of the present invention has the following chemical structure:

Following chemical formula is a general expression of hydroxyoxime to be used in the present invention:

where R stands for and X=Cl or H. Naturally similar hydroxyoximes can be employed for the same purpose. SME-529 in Example is a commercial name of a product from Shell Chemical Co., Ltd. for which R in the above formula is —CH$_3$.

The neutral phosphoric acids ester employed in the present invention are selected from the following groups:

where R is an alkyl group of 4 to 22 carbon atoms.

TBP (Tributyl phosphate) used in Example belongs to group (A) where R=$C_4H_9$.

The primary through quarternary amines employed in the present invention are selected from the following groups:

Primary amines are expressed by $RNH_2$, where R stands for an alkyl group having 4 to 22 carbon atoms. An example of the primary amines which was employed in Example is as follows:

$CH_3C(CH_3)_2CH_2C(CH_3)_2CH_2C(CH_3)_2CH_2C(CH_3.)_2CH_2C(CH_3)_2NH_2$

Secondary amines are expressed by a formula $R_2NH$, where R is generally an alkyl group having 4 to 22 carbon atoms. A typical one which was employed in the test is as follows:

Tertiary amines are expressed by a formula $R_3N$, where R is an alkyl group having 4 to 22 carbon atoms. A typical one which was employed in the test is shown below.

$[CH_3-CH_2-CH_2-CH_2-CH_2-CH_2-CH_2-CH_2]_3N$

Quarternary amines are typically shown by the following formula in the form of a salt:

where R is an alkyl group having 4 to 24 carbon atoms. Alternatively, those salts which are expressed by the following formula are also available.

where R=$C_8$ to $C_{10}$ for the compounds used for the test.

The diluents employed in the present invention are petroleum hydrocarbons including both aromatic and aliphatic hydrocarbons and a mixture of them. A mixture of a variety of hydrocarbons such as kerosine is often used.

Extracting agents are selected from any group. They may be used either alone or as a mixture of more than two.

Kind and composition of an extracting solvent is decided according to the nature of the object solution and the kind of expected impurities.

Concentrations of extracting agents are similarly decided, usually to 2 to 90% by volume.

BRIEF EXPLANATION OF THE DRAWINGS

In FIG. 2, the organic solvent (A) which extracts and contains the metals in the form of simple and complex ions is brought into contact with a recovering solution (B) containing HF, $NH_4HF_2$ and $NH_4F$ in the recovering stage (H). Simple fluorides or double fluoride with ammonium of these metals are collected in the separation stage (C), and then heated in a hydrogen-containing stream in a thermal composition stage (E) to obtain metals (F).

Those gases such as $NH_4F$, HF, F, $NH_3$ and $NH_4HF_2$(G) which evolve at the decomposition are absorbed in water at the absorption stage (D) and recycled to recovering Fe ion in the organic solvent.

DESCRIPTION OF PREFERRED EMBODIMENTS

Embodiments of the present invention will be described with reference to the attached drawings. However, this invention is not limited to the embodiments.

Following advantages are to be expected when the process of the present invention is carried out in industry:

(1) Superfine powders of various high purity metals (Mo, W, Zr, Nb, Cu, Zn Ni, Co and In) can be obtained without difficulty. These powders which are hardly oxidized in the atmosphere at room temperature could be utilized as electronic and powder processing source materials.

(2) The same products could be prepared even from low quality materials such as industrial wastes.

(3) A large scale treatment is not required for the process. The recovering agents as well as the organic solvents could be recycled and partial extension is possible of the process. Therefore a plant for this process may be possibly located anywhere close to the market, or close to a place where raw materials are available, as far as a hydrogen evolver could be installed.

The present invention will be illustrated below by way of examples.

EXAMPLE 1

Figure 1:
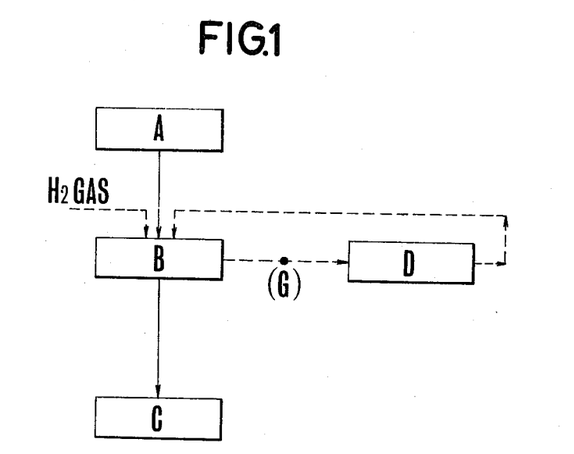
FIG. 1 shows the flow sheet according to the present invention, in which (A) is a raw material, that is simple fluorides and double fluorides with ammonium of the metals (Mo, W, Nb, Zr, Cu, Zn, Co, Ni and In). (B) is a thermal decomposition process, where the metal fluorides are thermally decomposed in a hydrogen-containing stream. The decomposition takes place in a temperature range approximately from 180° to 200° C. The reaction is completed at 250° to 280° C. for Cu, 350° to 500° C. for Ni and Co, and at 500° to 700° C. for Mo, W, In and Zn, to provide fine powders of the metals (C) of less than 0.5μ in diameter. The decomposition temperature differs depending on the $H_2$ content and the flow speed of the gas, but any metal is obtained at a much lower temperature than that at which the metal is reduced from its oxide. The gases (G), including $NH_4F$, HF, F and $NH_3$, which are evolved at the decomposition are transferred to the absorption stage (D) where the gases are absorbed and recovered in water.
Figure 2:
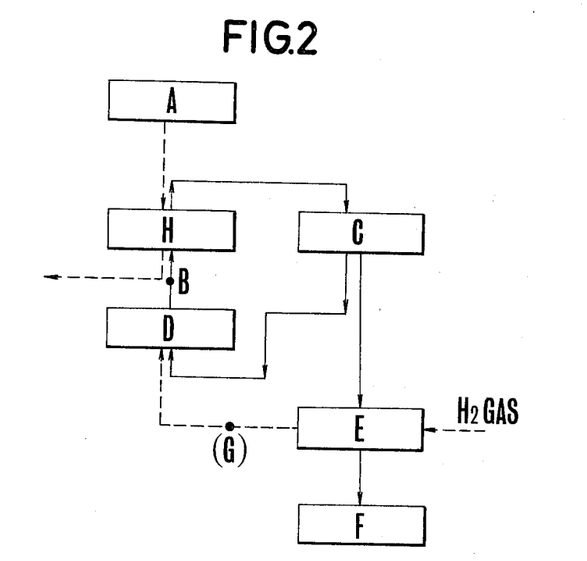
FIG. 2 shows an example of the process for obtaining metals (Mo, W, Nb, Zr, Cu, Zn, Co, Ni and In) from their simple or complex ions which have been extracted in organic solvents.
Figure 3:
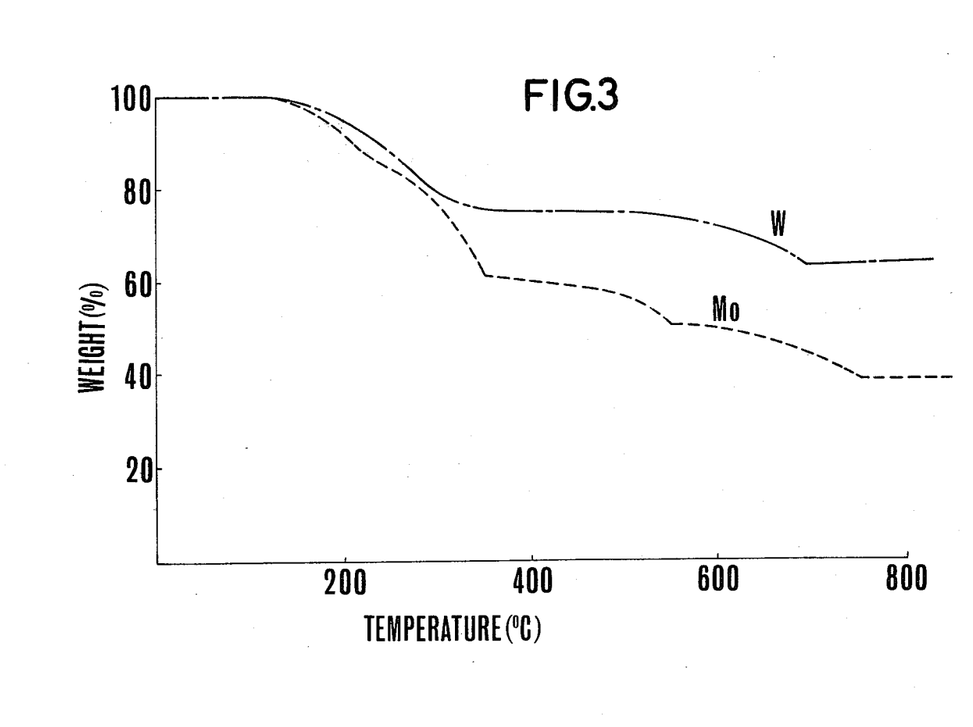
FIG. 3 shows how the termal decomposition of double fluorides of Mo and W with ammonium proceeds in a hydrogen-containing stream as expressed by the loss of weight as a function of temperature. Similar relations are shown in FIG. 4 for Cu and Zn, in FIG. 5 for Ni and Co, in FIG. 6 for In, and in FIG. 7 for Zr and Nb.
Figure 4:
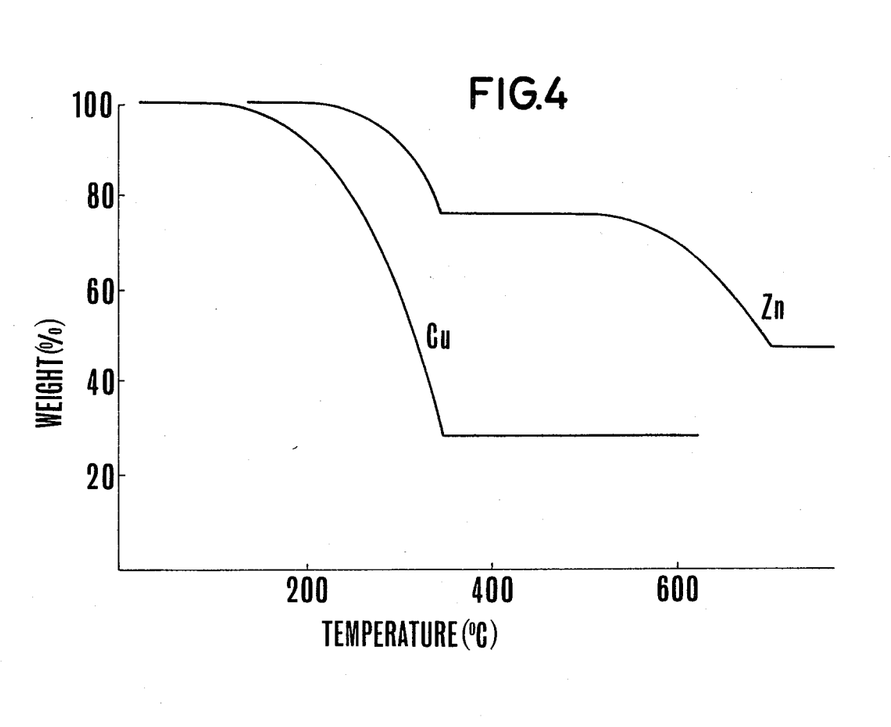
Figure 5:
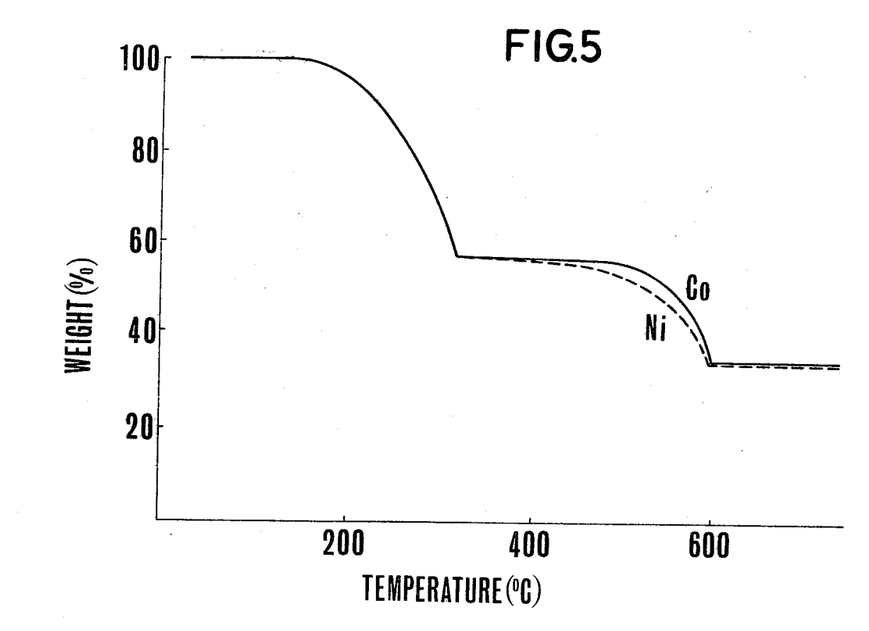
Figure 6:
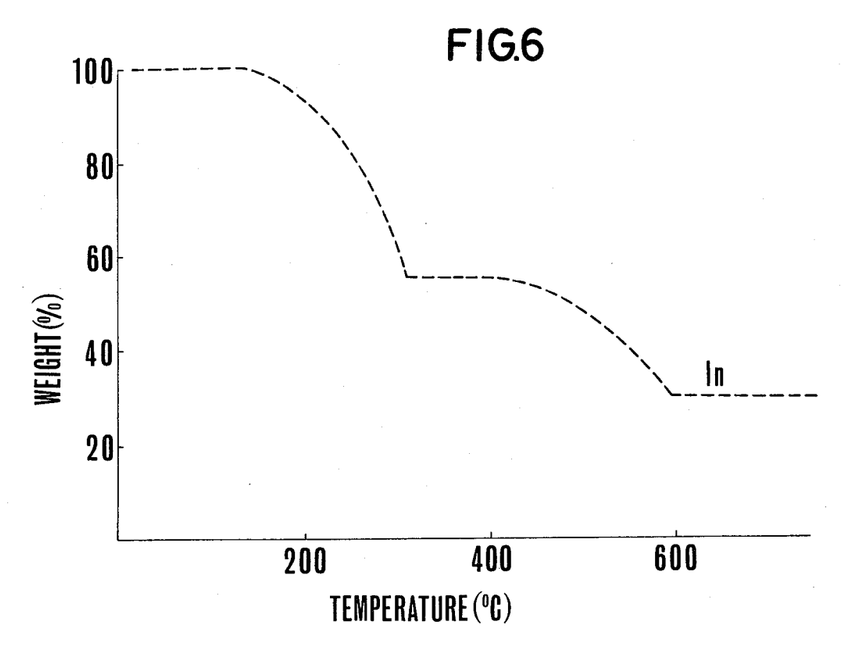
Figure 7:
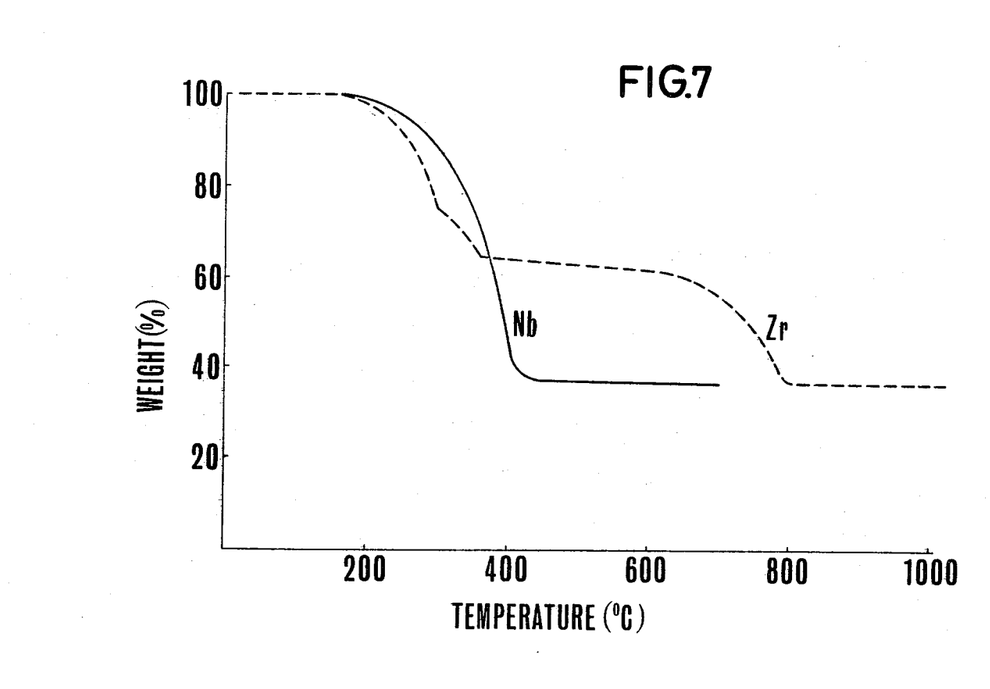

Double fluorides of metals with ammonium were heated by gradually elevated temperature in a hydrogen-containing stream, and the decrease of weight as a result of thermal decomposition is shown in FIGS. 3 to 5. The rate of the temperature elevation is 7° C./min. everywhere.

Mo and W, as seen in FIG. 3, begin to lose weight at 150° to 200° C., liberating some of $NH_4F$, and are reduced into the metallic state. The metallic powder obtained when the temperature was elevated up to 700° C. was examined with an X ray diffractometer. Thus the metallic state was confirmed.

Start of decomposition was ascertained with Cu at 150° to 180° C., as shown in FIG. 4, from the entailed weight change. Further metallic Cu was obtained at 250° to 280° C. The metallic state was confirmed by the X ray diffractometer study of the metallic powder which was obtained by heating up to 300° C.

In case of Zn, as seen in FIG. 4, decomposition takes place at about 200° C. and terminates at 600° to 700° C. This was confirmed from the weight change and the X ray diffractometer study.

For Co, Ni and In, the weight change confirmed start of the first decomposition at 180° to 230° C. and the second decomposition at 450° to 550° C., as shown in FIG. 5. The X ray diffractometer study with the metallic powder which was obtained by heating up to 600° C. confirmed the metallic state.

It seems from FIGS. 3 to 5 that the double fluoride of metals with ammonium is decomposed first into corresponding metal fluoride and then into respective metal. The diameter of the metallic powder is in the range from 0.1 to $0.5\mu$. Re-oxidation did not occur in 24 hour standing in the atmospheric condition and less than 1% was re-oxidized in 720 hours.

EXAMPLE 2

Organic solvents which contain metal compounds obtained by extraction in the concentration range 0.15 to 0.06 M were submitted to the recovering test. Results are shown in Table 1.

TABLE 1

| Metal | Organic solvent | Recovering solution | Percentage recovered (%) | Example of product |
|---|---|---|---|---|
| Mo | 30% $D_2EHPA$ + 70% kerosine | 100 g/l $NH_4HF_2$ | 99.1 | $(NH_4)_2MoF_8$ |
|  | 30% $D_2EHPDTA$ + 70% n-paraffin | 250 g/l $NH_4HF_2$ | 79.7 | $(NH_4)_2MoF_8$ |
|  | 10% TOA + 90% isoparaffin | 100 g/l $NH_4F$ | 99.5 | $(NH_4)_2MoOF_6$ |
| W | 20% $D_2EHPDTA$ + 10% OPPA + 70% isoparaffin | 200 g/l $NH_4HF_2$ | 81.4 | $(NH_4)_2WO_2F_4$ |
|  | 40% TBP + 10% MIBK + 50% isoparaffin | 100 g/l $NH_4F$ | 99.8 | $(NH_4)_2WOF_6$ |
|  | 10% TOA + 10% TBP + 80% kerosine | 100 g/l $NH_4F$ | 99.8 | $(NH_4)_2WOF_6$ |
| Cu | 30% $D_2EHPA$ + 70% isoparaffin | 100 g/l HF | 99.8 | $CuF_2$ |
|  | 20% SME-529 + 10% $D_2EHPA$ + 70% kerosine | 200 g/l $NH_4HF_2$ | 99.1 | $(NH_4)_2CuF_4$ |
| Zn | 30% V-10 + 70% n-paraffin | 100 g/l HF | 100 | $ZnF_2$ |
|  | 10% V-10 + 10% SME-529 + 10% $D_2EHPA$ + kerosine | 50 g/l $NH_4HF_2$ | 98.4 | $NH_4ZnF_3$ |
| Co | 30% $D_2EHPA$ + 10% SME-529 + isoparaffin | 100 g/l HF | 100 | $CoF_2$ |
|  | 30% $D_2EHPDTA$ + isoparaffin | 250 g/l $NH_4HF_2$ | 100 | $(NH_4)_2CoF_4$ |
|  | 30% $D_2EHPA$ + 10% OPPA + kerosine | 150 g/l $NH_4F$ | 100 | $(NH_4)_2CoF_4$ |
| Ni | 30% SME-529 + 10% $D_2EHPA$ + isoparaffin | 150 g/l HF | 100 | $NiF_2$ |
|  | 20% SME-529 + 10% OPPA + isoparaffin | 200 g/l $NH_4HF_2$ | 100 | $(NH_4)_2NiF_4$ |
|  | 30% V-10 + 10% OPPA + isoparaffin | 100 g/l $NH_4F$ | 100 | $(NH_4)_2NiF_4$ |
| In | 30% $D_2EHPA$ + kerosine | 100 g/l HF | 100 | $InF_3$ |
|  | 30% $D_2EHPA$ + 10% TBP + isoparaffin | 100 g/l $NH_4F$ | 100 | $InF_3$ |
|  | 30% $D_2EHPDTA$ + 5% V-10 + n-paraffin | 350 g/l $NH_4HF_2$ | 100 | $(NH_4)_3InF_6$ |
| Nb | 40% TBP + 10% TOA + 50% isoparaffin | 150 g/l $NH_4F$ | 95.1 | $(NH_4)_2NbF_7$ |
|  | 30% $D_2EHPDTA$ + 70% kerosine | 200 g/l $NH_4HF_2$ | 63.4 | $(NH_4)_2NbF_7$ |
|  | 75% MIBK + 5% TBP + 20% kerosine | 100 g/l $NH_4F$ | 48.9 | $NH_4NbF_6$ |
| Zr | 30% $D_2EHPA$ + 5% SME-529 + isoparaffin | 150 g/l $NH_4HF_2$ | 90.8 | $(NH_4)_2ZrF_6$ |
|  | 20% $D_2EHPDTA$ + 20% TBP + kerosine | 250 g/l $NH_4HF_2$ | 45.7 | $(NH_4)_3ZrF_7$ |
|  | 10% TOA + 10% MIBK 10% TBP + 70% n-paraffin | 100 g/l $NH_4F$ | 98.8 | $(NH_4)_2ZrOF_6$ |
|  | 20% $D_2EHPDTA$ + 10% V-10 | 250 g/l $NH_4HF_2$ | 89.5 | $(NH_4)_2ZrF_6$ |

TABLE 1-continued

| Metal | Organic solvent | Recovering solution | Percentage recovered (%) | Example of product |
|---|---|---|---|---|
| | + 10% TBP + 60% kerosine | | | |

Remarks:
(1) Concentrations in the organic solvents are expressed in % in volume.
(2) 'Percentage recovered' is the ratio in percent of the amount of the particular metal, which has been transferred from the organic phase to the aqueous phase when the two phases contact once under the condition of O/A = 1.0/1.0, divided by the original amount of the metal in the organic phase.
(3) Recovery was carried out at a temperature of 25 to 26° C. for both organic and aqueous phases and for 10 minute shaking.
(4) 'Product' was presumed from the analysis. Thus, the most probable compound was selected among known fluorides of the metal, as estimated from the molar ratio of N, F and the metal.
(5) $D_2$EHPA: Di-2-ethylhexyl phosphoric acid
OPPA: Octylphenyl phosphoric acid
TBP: Tributyl phosphate
$D_2$EHPDTA: Di-2-ethylhexyldithio phosphoric acid
V-10: Carboxylic acid; Versatic acid 10, Shell Chemical Co., Ltd.
SME-529: Hyfroxime; Shell Chemical Co., Ltd.
TOA: Tertiary amine, Trioctylamine In the above stated process, simple and complex ions of metals (Mo, W, Cu, Zn, Co, Ni and In) extracted by and dissolved in an organic solvent is brought into contact with an aqueous solution containing one or more compounds selected from the group consisting of $NH_4F$, $NH_4HF_2$ and HF, to obtain fluoride or double fluoride of the metals with ammonium. Alternatively the metal ammonium fluorides were prepared either by dissolving the metal in HF and neutralizing with $NH_3$, or by dissolving the metal in $NH_4OH$ and then adding HF.

These metal ammonium fluorides were thermally decomposed for test. Result was the same as shown in FIGS. 3 to 5, and the metals obtained were confirmed by the X ray diffraction method. It has been proved that the process of this invention can be applied to a metal fluoride and a metal ammonium fluoride obtained by an arbitrary process, to prepare the metal by heating the fluorides in a hydrogen-containing stream.

What is claimed is:

1. A process for preparing high purity metals of Mo, W, Zr, Nb, Cu, Zn, Co, Ni and In from fluorine-containing compounds comprising,
heating an ammonium fluoride of said metal in a hydrogen-containing stream.

2. A process for preparing high purity metals of Mo, W, Zr, Nb, Cu, Zn, Co, Ni and In from fluorine-containing compounds comprising,
heating an ammonium fluoride of said metal in a hydrogen-containing stream wherein the metal fluoride and the metal ammonium fluoride are prepared from an organic solvent solution of an extracted simple or complex ion of a metal selected from the group consisting of Mo, W, Zr, Nb, Cu, Zn, Co, Ni and In, where the organic solvent is one or more extracting agents selected from the group consisting of alkyl phosphoric acids, dialkyldithiophosphoric acids, diaryldithiophosphoric acids, hydroxyoximes, ketones, neutral phosphoric acid esters, carboxylic acids, and primary to quarternary amines, and diluted with a petroleum hydrocarbon, by bringing into contact with an aqueous solution containing one or more compounds selected from the group consisting of HF, $NH_4HF_2$ and $NH_4F$.

* * * * *